Jan. 12, 1954 R. J. SLEZAK 2,665,732
VALVE FOR TUBELESS TIRE DIAPHRAGMS
Filed Nov. 27, 1951 3 Sheets-Sheet 2
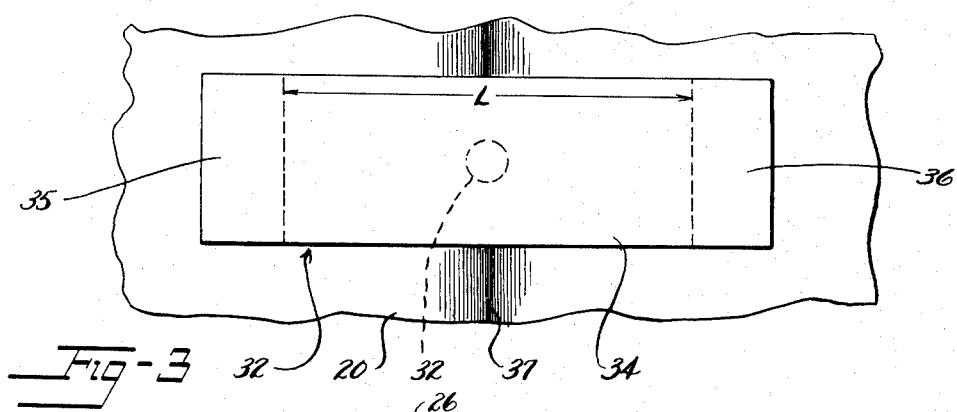
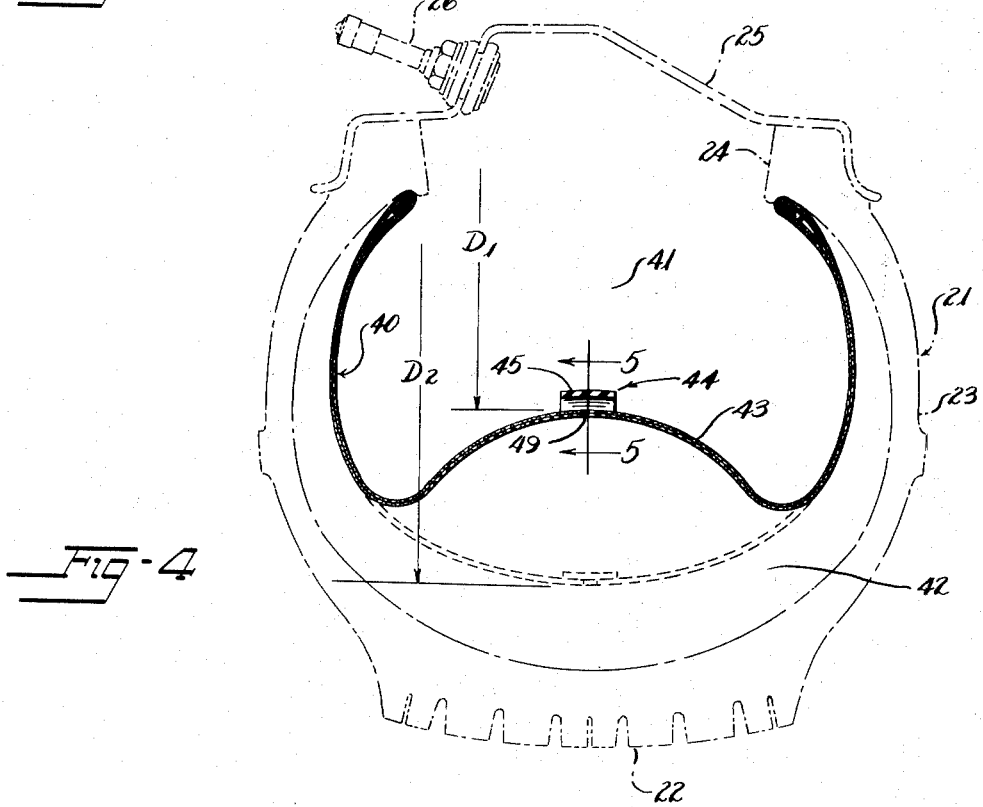
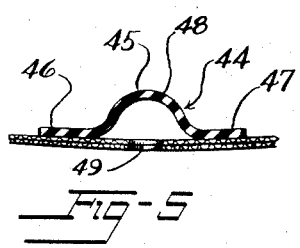
INVENTOR.
RAYMOND J. SLEZAK
BY Patented Jan. 12, 1954

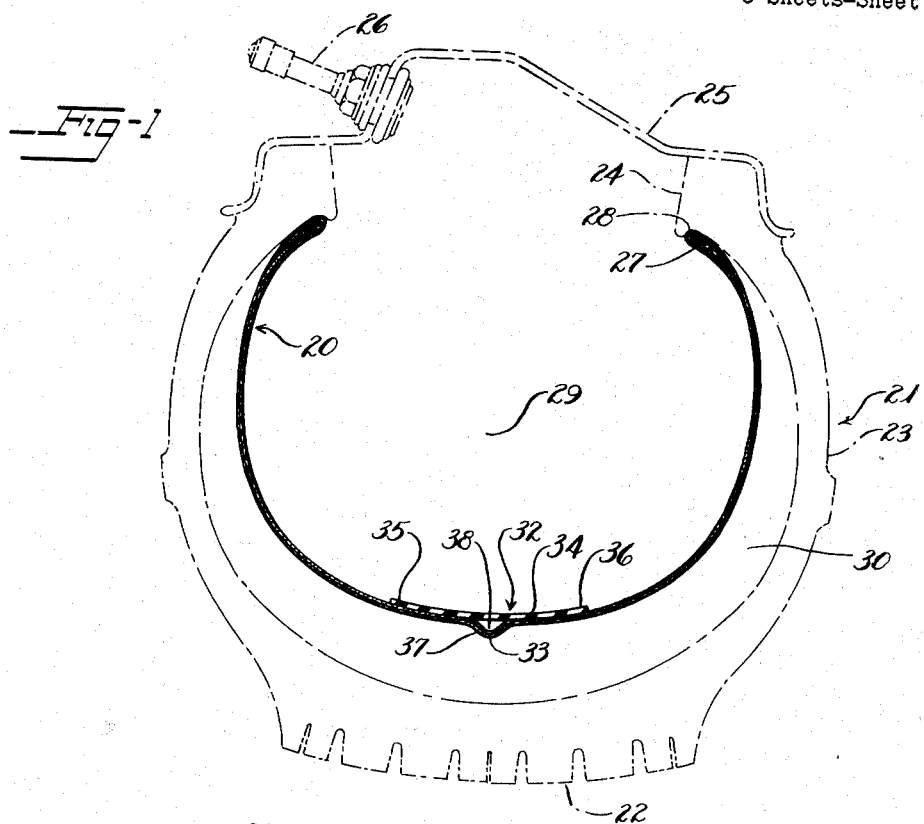
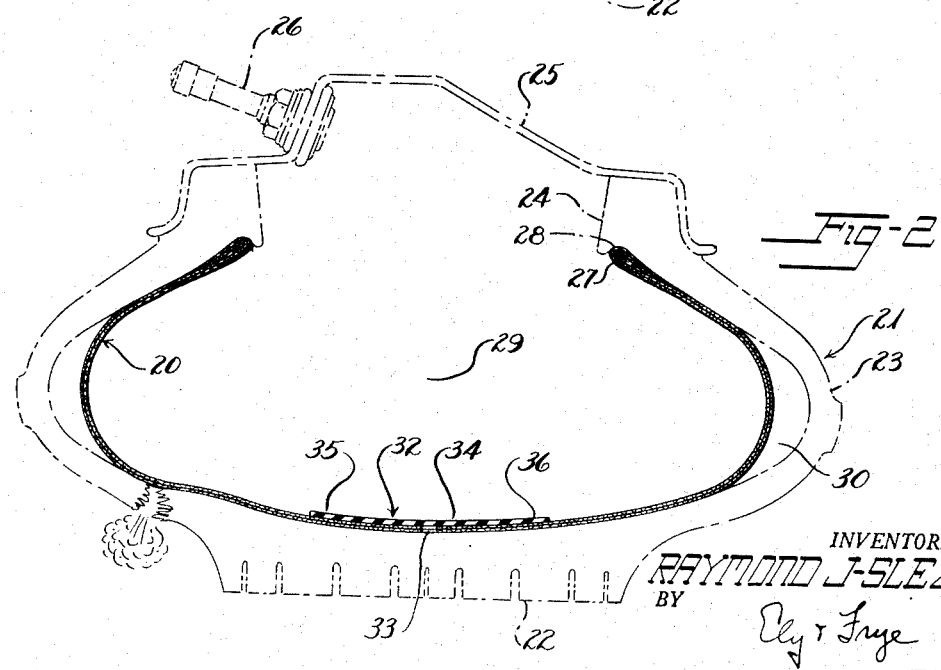

2,665,732

UNITED STATES PATENT OFFICE 2,665,732

VALVE FOR TUBELESS TIRE DIAPHRAGMS

Raymond J. Slezak, Akron, Ohio, assignor to The Firestone Tire & Rubber Company, Akron, Ohio, a corporation of Ohio Application November 27, 1951, Serial No. 258,333

9 Claims. (Cl. 152—342)

This invention relates to tires, of the type known as tubeless tires, which have safety diaphragms substituted for blowout-safe inner tubes, and relates more particularly to an improved valve construction for such diaphragms.

The so-called tubeless tires are inflated by introducing air into the chamber defined by the tire casing and rim upon which it is mounted, the air pressure being maintained by means of a tight seal between the bead portion of the tire and rim. In the absence of a diaphragm, air is introduced into the tire without difficulty by means of an inflating valve mounted in the rim.

However, in some cases, it has been found desirable to provide an auxiliary or safety diaphragm to give protection against blowouts, the diaphragm dividing the tire into two chambers, an outer chamber between the tire and the diaphragm and an inner chamber between the diaphragm and the rim, so that when a blowout occurs, the diaphragm will retain air within the inner chamber to support the car until it can be brought safely to a stop. The use of such safety diaphragms, however, introduces difficulties in inflating the tire, for communication must be provided between the two chambers when the tire is being inflated but must be cut-off when a blowout occurs. In some cases "slow-leak" valves in the form of apertures of predetermined size have been tried, but these are inconvenient because the rate of inflation must necessarily be very slow in order to permit air to pass into the outer chamber. In other cases, check valves have been used, but these are also unduly sensitive to the rate of inflation, and accordingly, inflation must proceed at a slow rate.

The present invention avoids these difficulties by providing a novel valve construction having an operation which depends not upon the rate at which air passes through it from one chamber to another, but upon the distention of the diaphragm due to a difference in air pressures in the two chambers. When the tire is inflated, air will readily pass through the valve, for there is not at this time a substantial difference in pressure between the two chambers. In contrast, when a blowout occurs, the pressure in the outer chamber almost instantly becomes atmospheric while that in the inner chamber remains substantially at inflation pressure. The difference in pressure causes the diaphragm to distend in a manner to close the valve. The valve is simple in construction, comprising a hole in the diaphragm which is covered by a flat strip of material secured at its ends to the diaphragm and overlying the hole. In one form of the invention, the strip is substantially shorter in length than the spacing along the diaphragm of its points of attachment to the diaphragm, and it is elastic so that in its normal position it pulls a wrinkle of considerable size in the diaphragm. Thus, air will normally pass between the strip and the wrinkled diaphragm and through the hole with relative freedom. However, when a blowout occurs, the sudden release of pressure in the outer chamber will cause the diaphragm to distend to its outermost position, pulling out the wrinkle and simultaneously stretching the strip, pulling it tight against the diaphragm to close off the hole and prevent further passage of air therethrough.

Another form of the invention is useful with a diaphragm of the depressed crown type such as that described in the co-pending application of W. E. Lyon, Serial No. 252,885, filed October 24, 1951. In this form the strip extends circumferentially of the crown of the diaphragm and is appreciably longer than the adjacent length of diaphragm so that the strip is wrinkled. During inflation, the air will pass freely between the wrinkled strip and the diaphragm. When the diaphragm is distended by a blowout, the recessed crown snaps out to a considerably greater circumference and in so doing stretches the strip sufficiently to eliminate the wrinkle. The distention of the diaphragm thus enables the strip to lie snugly against the diaphragm and seal off communication between the inner and outer chambers of the tire.

The general object of the invention, therefore, is to provide a valve having the characteristics described above in which the air may pass freely therethrough while the tire is being inflated but which will close immediately when the tire blows out.

Another object is to provide a valve construction useful with a flexible partition which is operated by a severe distortion of the partition to close the valve.

Another object is to provide a valve for a partition dividing a tire into two compartments in which the valve comprises a strip overlying an apertured partition portion which, when the air pressure in one of the compartments drops suddenly to atmospheric pressure, undergoes a severe, local distention to pull the strip into sealing contact.

Other objects are to provide a valve construction which is simple and economical to manufacture, which is rugged and effective, and which avoids the difficulties of the prior art.

Further objects and advantages will more fully appear from the following description of several forms of the invention, reference being had to the accompanying drawings in which:

Figure 1 is a transverse sectional view of a tubeless tire having a safety diaphragm with a valve embodying the present invention in its normal position;

Figure 2 is a view corresponding to Figure 1 showing the operation of the valve when a blowout occurs;

Figure 3 is a fragmentary view on an enlarged scale of the diaphragm showing the valve of Figures 1 and 2 in plan view;

Figure 4 is a transverse sectional view showing another form of the invention at which the valve strip is disposed in a circumferential direction along a diaphragm of the recessed crown type;

Figure 5 is a circumferential sectional view of the valve construction of Figure 4, the section being taken in the plane indicated by the lines 5—5 of Figure 4;

Figure 6:
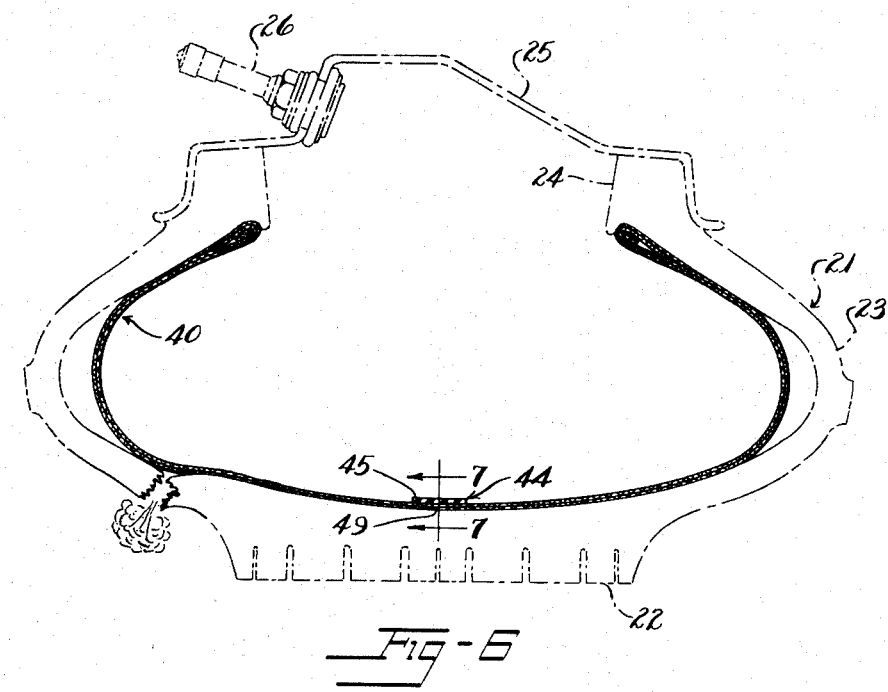
Figure 6 is a view of the assembly of Figure 4 showing the valve in closed position when the recessed crown is snapped outwardly to its fully distended position.

One form of the invention is shown in Figure 1 in connection with a diaphragm 20 mounted within a tire 21 having a construction such as that described in detail in the co-pending application of F. S. King and Coben, Serial No. 194,129, filed November 4, 1950. The tire comprises a tread portion 22, side walls 23 and bead portions 24 mounted on a rim 25. The beads of the tire seat firmly against and have sealing contact with the flanges of the rim so that the tire and rim as an assembly are capable of retaining air under the desired pressures, the air being introduced by an inflation valve 26 secured to the rim as shown.

The safety diaphragm 20 is mounted within the tire by means of inextensible bead portions 27 which seat against the annular shoulders 28 of the tire. It will be noted that the diaphragm divides the tire into an inner chamber 29 and an outer chamber 30. In the event of a blowout with the accompanying sudden loss of pressure within the outer chamber 30, the diaphragm will retain the air within the chamber 29 and act as an emergency load-sustaining member to prevent complete collapse of the tire.

The diaphragm as described in the above noted King application is built up of bias-laid ply material, in a manner similar to the construction of the casing of a tire, the plies being wrapped around and firmly anchored to the wire beads 27. Such a construction imparts flexibility as well as strength to the diaphragm.

A valve construction embodying the invention and indicated generally at 32 provides communication between the chambers 29 and 30 to enable inflation of the tires. Essentially the valve comprises an aperture 33 punched in the crown of the diaphragm which is covered by an underlying strip 34 secured as at 35 and 36 to the inner surface of the diaphragm. The strip is rectangular in form and has a free length considerably shorter than the distance along the diaphragm between the points 35 and 36. The strip has considerable elastic strength so that it pulls in a wrinkle, indicated at 37, in the diaphragm. The diaphragm and the strip define a passage 38 leading to the hole 33 and because of the wrinkle the passage 38 has the capacity to pass relatively large volumes of air rapidly and easily into chamber 30.

The normal position of the diaphragm and strip is shown in solid lines in Figure 1, which is the position taken when the air pressures in the two chambers are substantially equal. In this position, air can pass freely through the passage 38 and through the hole 33. The tire as a consequence can be rapidly and easily inflated.

When a blowout occurs with the sudden loss of pressure in chamber 30, the diaphragm will be distended by the air in chamber 29 to assume the position shown in Figure 2. The distention of the diaphragm pulls out the wrinkle 37 and stretches the strip 34 between the points 35 and 36 until its length between the points becomes equal to the length of the diaphragm between these points. In this position, strip 34 lies snugly against the diaphragm as shown in Figure 2 closing off the passage 38 and sealing the hole 33 against the passage of air. The air pressure in chamber 29 is thus retained and the load on the tire can be supported until the automobile is brought safely to a stop.

It will be noted that the pulling out of the wrinkle 37 amounts to a rather severe distortion of the diaphragm, for the wrinkle with a radius of curvature of a fraction of an inch is distended to a radius of several inches. It is this rather severe distortion of the diaphragm which is common to the several forms of the invention and upon which the operation of the several forms of valve depends.

Figure 7:
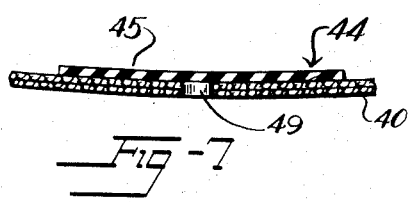
Figure 7 is a longitudinal sectional view taken in the plane indicated by the lines 7—7 of Figure 6, showing the valve in its closed position.

Another form of the invention is especially adapted for use with a diaphragm having a recessed crown such as that described in the co-pending application of Walter E. Lyon, Serial No. 252,885, filed October 24, 1951, to which reference is made for a detailed description of the diaphragm and its method of use. Such a diaphragm construction is illustrated in Figures 4–7. It is sufficient to note that the diaphragm 40 is similar to the diaphragm 20 of Figure 1 in that it comprises an air-tight partition dividing the tire into an inner chamber 41 and an outer chamber 42. The diaphragm 40 differs, however, in having a recessed crown indicated at 43 which normally occupies the position indicated by the solid lines in Figure 4. If a blowout should occur to release the pressure in chamber 42, the diaphragm 40 will distend with the crown 43 snapping outwardly to a position shown by dotted lines in Figure 4 and by solid lines in Figure 6. The distended diaphragm 40 will, of course, retain air in the chamber 41 to sustain the load on the tire in the manner indicated in Figure 6.

The diaphragm 40 is provided with a valve construction indicated generally at 44 which follows the same principles of operation as the valve 32 described with reference to Figures 1–3, but it depends on the increase in diameter of the recessed crown for its operation. The valve 44 comprises a strip 45 extending circumferentially of the diaphragm and secured at its ends 46 and 47 to the recessed crown at about its center. The strip is appreciably longer than the distance between points 46 and 47 along the diaphragm and, as a result, has a wrinkle 48 of considerable size adjacent the aperture 49 in the diaphragm, see also Figure 5.

In the event of a blowout with a sudden release of the pressure in chamber 42, the air in chamber 41 will cause the recessed crown to snap outwardly increasing from a diameter indicated at $D_1$ to a diameter $D_2$, see Figure 4. Necessarily, the circumferential length along the central portion of the crown increases by an amount equal to $\pi(D_2-D_1)$, and this increase in circumferential length necessarily results in a lengthening of the diaphragm between points 46 and 47 which is sufficient to pull out the wrinkle 48 in the strip 45 causing it to lie snugly against the diaphragm and seal off the aperture 49. This position is shown in dotted lines in Figure 4 and in solid lines in Figures 6 and 7. It will be noted in Figure 6 that the increase in diameter of the crown portion of the diaphragm is not quite so great at the point which sustains the load (compare with Figure 4); but it is still sufficient to insure the pulling out of the wrinkle 48. Of course, after a blowout occurs, every other portion of the diaphragm, except that which is bearing the load, assumes the dotted line position of Figure 4.

In the forms of the invention described above, the distention of the diaphragm will cause the diaphragm and the strip to come into close proximity to each other. Once this position of proximity is reached, the strip will flutter shut against the aperture, and then the air pressure within the inner chamber will press the strip firmly against the diaphragm to maintain it in closed position.

While the valve construction has been illustrated in connection with a diaphragm for tubeless tires, it will be apparent that such a valve construction will also be suitable in an inner tube of the type described and shown in U. S. patent to Lee No. 2,173,065, issued September 12, 1939, which has a partition within the tube to divide it into two chambers. The valve construction, in fact, is suitable for use with any flexible partition which divides a space into two chambers and which is intended to retain air in one of the chambers when the pressure in the remaining chamber is suddenly reduced. It will be noted that in all the forms of the invention, the diaphragm has an appreciable local distention in order to operate the valve. In some forms of the invention it is desirable that the valve strip be elastic, but in others it will be noted that neither the diaphragm nor the strip need be elastic; all that is required is that they be flexible so as to be capable of relatively sharp bending.

Various modifications of the invention will be aparent to those skilled in the art without departing from the scope of the invention, the essential features of which are summarized in the following claims.

What is claimed is:

1. In a tire in which the interior of the tire is divided into two chambers by a flexible partition, a valve construction comprising a partition element having an aperture and a flat strip element spanning said aperture and secured at its ends to said partition element at two spaced points, the lengths of said partition element and said strip element between said points normally differing substantially whereby one of said elements has a bulge of substantial size formed therein.

2. In a tire in which the interior thereof is divided into inner and outer chambers by a flexible partition, a valve construction comprising an apertured partition portion, and a flat strip of elastic material secured by its ends to said partition at points lying on opposite sides of said aperture, the length of said strip being substantially shorter than the distance between said points as measured along said partitions whereby said elastic strip pulls said points together to produce a bulge of substantial size in said partition portion.

3. A valve construction according to claim 2 in which said strip extends in a direction circumferentially of said tire.

4. A valve construction according to claim 2 in which said strip extends transversely of said tire.

5. In a tire of the tubeless type having a flexible diaphragm dividing the interior of the tire into an inner and outer chamber, said diaphragm having a recessed crown portion, a valve construction comprising a flat strip extending circumferentially of the tire and secured at its ends to spaced points along the inner crown surface of said diaphragm, said strip overlying an aperture in said diaphragm intermediate between said points, the length of said strip normally being appreciably greater than the distance between the points when the crown is in its recessed position and being substantially equal to the distance between said points when the crown is in its distended position whereby in the former position the strip has a bulge of substantial size and in the latter position the strip lies flush against said aperture to close the same against passage of air from said inner chamber.

6. In a tire of the tubeless type having a flexible diaphragm dividing the interior of the tire into an inner and outer chamber, said diaphragm having a recessed crown portion, a valve construction comprising a flat elastic strip extending circumferentially of the tire and secured at its ends to spaced points along the inner crown surface of said diaphragm, said strip overlying an aperture in said diaphragm intermediate between said points, the length of said strip normally being appreciably greater than the distance between the points when the crown is in its recessed position and being substantially equal to the distance between said points when the crown is in its distended position whereby in the former position the strip has a bulge of substantial size and in the latter position the strip lies flush against said aperture to close the same against passage of air from said inner chamber.

7. For use in a tire of the tubeless type, a flexible diaphragm dividing the interior of the tire into an inner and outer chamber, a valve comprising a flat strip portion secured at its ends to spaced points along the inner crown surface of said diaphragm, said diaphragm having an aperture in the portion between said points, the length of said strip portion normally being appreciably different from the length of the diaphragm portion when the diaphragm is in normal position and being substantially equal to the distance between said points when the diaphragm is in its distended position whereby in the normal position one of said portions has a substantial bulge and in the latter position the strip lies flush against said aperture to close the same against passage of air from said inner chamber to said outer chamber.

8. A flexible partition for use in a pneumatic tire, said partition having an opening to pass air, and a strip secured to points on opposite sides of said opening to overlie said opening, the length of said strip portion between said points of securement being appreciably different from the length of that portion of the diaphragm between said points, the difference of said lengths being such that an abrupt change of curvature is manifest in one of said portions in the region of said opening when the pressures on opposite sides of said diaphragm are substantially equal.

9. For use in a tire of the tubeless type, a diaphragm dividing the interior of the tire into an inner and outer chamber, said diaphragm being flexible and having a crown portion which normally, when the pressures in said chambers are equal, is recessed and which, when the pressure in the inner chamber substantially exceeds the pressure in the outer chamber, is distended outwardly, whereby the crown circumference in the latter position is substantially greater than in the former position, said diaphragm having a valve comprising a flat, elastic strip extending circumferentially of the diaphragm and secured at its ends to spaced points along the inner crown surface of said diaphragm, said strip overlying an aperture in said diaphragm between said points, the length of said strip normally being appreciably greater than the distance between the points when the crown is in its recessed position and being substantially equal to the distance between said points when the crown is in its distended position, whereby in the former position the strip has a bulge of substantial size and in the latter position the strip lies flush against said aperture to close the same against the passage of air from said inner chamber.

RAYMOND J. SLEZAK.

References Cited in the file of this patent

UNITED STATES PATENTS

| Number | Name | Date |
|---|---|---|
| 1,051,738 | Kavanaugh | Jan. 28, 1913 |
| 2,207,212 | Arey | July 9, 1940 |
| 2,308,955 | Wilson | Jan. 19, 1943 |
| 2,404,578 | Liska | July 23, 1946 |

OTHER REFERENCES

Tires Service Station, February 1951, vol. 32 No. 7, page 36.